United States Patent Office 2,736,730
Patented Feb. 28, 1956

2,736,730
EPOXY-POLYCHLORO-BICYCLO(2.2.1) HEPTENE

Morton Kleiman, Chicago, Ill., assignor to Velsicol Chemical Corporation, a corporation of Illinois No Drawing. Application December 2, 1954,
Serial No. 472,765

1 Claim. (Cl. 260—348)

This invention relates to the production of a new composition of matter. More specifically, the present invention relates to the production of 5,6-epoxy-1,2,3,4,7,7-hexachlorobicyclo-(2.2.1)-2-heptene.

The unusual structure of the present composition characterized by a hexachlorinated bicyclic ring system and an epoxy grouping lends itself to several interesting and valuable applications.

One useful application of the present product is as an intermediate for the production of polyether resinous materials. These resins can be prepared by treating the above epoxy compound with a $BF_3$ or other Friedel-Crafts type catalyst to result in polymerized materials which have unusual fire and heat resistant properties.

Another useful application for the present compound is as an intermediate in the preparation of its corresponding glycol which in turn has great value in the preparation of polyester resins. The dihydroxy derivative is prepared by treatment of the epoxy compound with an aqueous solution of strong mineral acid such as HCl, $H_2SO_4$ or the like, in water or in an organic carboxylic acid. In the latter instance a simple monoester of the glycol is obtained which is useful as such or which can be readily hydrolyzed. This glycol product has especially interesting properties when incorporated into polyester resins wherein fire resistant, fungistatic, and heat resistant properties are desired.

By itself the 5,6-epoxy-1,2,3,4,7,7-hexachlorobicyclo-(2.2.1)-2-heptene is useful as an insecticidal and fungicidal compound and it can be incorporated into industrial products or applied in insecticidal formulations as an active ingredient to agricultural crops. To further enhance fungistatic activity, the present compound can be reacted with mercuric chloride or other heavy metal salt to provide a relatively stable complex having enhanced biological activity.

The compound of the present invention is prepared by epoxidizing hexachlorobicyclo - (2.2.1) - 2,5 - heptadiene with an organic peracid. The aforementioned starting material can be prepared by adducting hexachlorocyclopentadiene with vinyl chloride in equimolar ratios. The resulting Diels-Alder adduct is then dehydrohalogenated by treatment with alcoholic KOH to produce the desired hexachlorobicycloheptadiene material.

The epoxidation is readily accomplished by the use of organic peracids such as peracetic acid, perbenzoic acid, monoperphthalic acid, or the like. Generally, the use of a molar excess of organic peracid is desirable and a molar excess of about two to one is preferred. The epoxidation reaction generally takes between about three hours to about 70 hours, which time varies inversely with the temperature of the reaction. Broadly, the temperature may vary from about 5° C. to about 95° C., but a preferred range of temperatures is from about 30° C. to about 60° C. At the preferred temperature, the reaction time may be from about 15 hours to about 30 hours. If desired, additional solvents such as those which are usually employed in the art of peroxidation may be used.

The following examples illustrate the preparation of the starting material and final product:

Example I (a) Hexachlorocyclopentadiene (2,205 g.; 8.1 moles) was placed into a 2-liter, 3-necked flask equipped with a stirrer, thermometer and reflux condenser containing a gas inlet tube equipped with a sparger extending below the surface of the liquid. While maintaining the hexachlorocyclopentadiene at 200° C., vinyl chloride was bubbled through it continuously for a period of fourteen hours. During this period 482 g. (7.7 moles) of vinyl chloride reacted with the hexachlorocyclopentadiene. The product of this reaction, 1,2,3,4,5,7,7-heptachlorobicyclo-(2.2.1)-2-heptene, was purified by vacuum fractional distillation. The product distilled at 147–148° C. (stillhead temperature) at a pressure (absolute) of 12 mm. of mercury.

(b) 1,2,3,4,5,7,7 - heptachlorobicyclo - (2.2.1) - 2-heptene (33.5 g.) was added to a refluxing solution of KOH (8 grams) in absolute ethanol (100 ml.). Heating was continued to maintain the mixture at reflex temperature for three additional hours. After this time the ethanol was removed by evaporation in vacuo and the residue taken up in hexane. The hexane solution was filtered to remove KCl and unreacted KOH. The hexane was removed from the filtrate by distillation, and the residue, containing the desired hexachlorobicyclo-(2.2.1)-2,5-heptadiene product, was purified by vacuum fractional distillation with said product being recovered at a temperature of 128–130° C. at 7.0 mm. mercury pressure (absolute).

Example II

To a solution of hexachlorobicyclo-(2.2.1)-2,5-heptadiene (352 g.; 1.17 moles) and sodium acetate (5 g.) in glacial acetic acid (120 ml.) was added 44% peracetic acid (406 g.; 2.3 moles) containing sodium acetate (4 g.) in a portionwise manner, with stirring, over a two and one-half hour period. The ensuing exothermic reaction was maintained at 40–45° C. during the 2½-hour addition period and for twenty hours thereafter. Samples of the reaction mixture were periodically withdrawn and titrated iodometrically to determine the extent of utilization of peracid. After the twenty-hour period 60% of the peracetic acid had been utilized. At this time the reaction mixture was extracted with ether and the ether fraction washed with a sodium bicarbonate solution and dried over anhydrous sodium sulfate. The ether was then evaporated and the resulting residue was dissolved in pentane. The pentane solution was then filtered and the solvent evaporated under reduced pressure. The resulting residue was the crude desired product which can be purified by fractional distillation under vacuum and isolated as the fraction boiling at 98–109° C. at 0.8 to 0.9 mm. mercury pressure (absolute). Further purification can be accomplished, if desired, by crystallization from pentane solvent. The purified product melts at 111–112° C. and has the following elementary analysis:

| | C | H | Cl |
|---|---|---|---|
| | Percent | Percent | Percent |
| Calculated for $C_7Cl_6H_2O$ | 26.70 | 0.64 | 67.50 |
| Found for product | 26.80 | 0.73 | 67.36 |

Alternatively, the product of the present invention may be isolated and purified from the crude reaction mixture by chromatographic means, thus obviating the need of fractional distillation.

As was previously indicated, 5,6-epoxy-1,2,3,4,7,7-hexachlorobicyclo-(2.2.1)-2-heptene has broad utility as an intermediate for other materials. In the instance where this product is converted to the glycol by hydrolysis with strong mineral acid, the glycol thus produced has utility as an intermediate in the preparation of polyester resins wherein glycols are ordinarily used. This highly halogenated glycol can be reacted with dicarboxylic acids such as phthalic, maleic, succinic, sebacic and the like as the sole glycol reactant, or may be used in conjunction with other more conventional glycols such as ethylene glycol, diethylene glycol, propylene glycol, and the like.

Examples of the preparation of the glycol derivative of the present invention and the use of such glycol in the preparation of a polyester resin are shown in Examples III and IV respectively.

*Example III*

A mixture of 5,6-epoxy-1,2,3,4,7,7-hexachlorobicyclo-(2.2.1)-2-heptene (315 g., 1.0 mole), 450 ml. of acetic acid, 315 ml. of acetic anhydride, and 6 g. of concentrated sulfuric acid is heated fifteen hours at 70–100° C. The reaction mixture is poured into an excess of water and the combined material extracted with ether. The ether extracts are washed with aqueous sodium bicarbonate, and dried over sodium sulfate.

Isolation of the acetate of the glycol is accomplished by evaporation of the ether. Without further purification the residue is dissolved in 3 liters of methanol and the resulting solution is saturated with gaseous hydrogen chloride at the reflux temperature. Heating under reflux is continued for fifteen hours and the solvent is then evaporated. Purification is effected by dissolving the residue in ether and washing the ether solution with aqueous sodium bicarbonate and water. After drying the ether solution over sodium sulfate the product is isolated by evaporation of the ether.

*Example IV*

Into a 3-necked flask equipped with a stirrer, thermometer, and sintered glass-tipped gas inlet tube extending beneath the surface of the reactants are placed:

| | |
|---|---|
| 5,6 - dihydroxy - 1,2,3,4,7,7 - hexachlorobicyclo - (2.2.1) - 2 - heptene | 166.5 g. (0.5 mole). |
| Ethylene glycol | 31.0 g. (0.5 mole). |
| Maleic anhydride | 49.0 g. (0.5 mole). |
| Phthalic anhydride | 74.0 g. (0.5 mole). |

The contents of the flask are heated between 330–350° F., while an inert gas is passed into the gas inlet tube, for a period of about three hours and until an acid value of 40–50 is obtained. A clear, light colored, unsaturated alkyd resin is obtained, which is cast into open molds and allowed to cool.

A solution of the above alkyd (60 g.) was prepared in styrene (40 g.), at a temperature of 40–50° C. to facilitate solution. Benzoyl peroxide (0.5–1.0 g.) is dissolved into the mixture and the resulting solution poured into glass test tubes. The tubes with their contents are heated at 50–55° C. until gelation occurred, and then for an additional one to two hours at 65–75° C. A hard, clear, light-colored resin is thus obtained which can be ignited, but is self-extinguishing. Such resin is of value in the manufacture of structural materials where fire hazard is of importance such as in impregnated polyester resin automobile bodies, in plastic awnings, and the like.

When the present epoxy composition is used to prepare polyether resins by reaction with $BF_3$, it may likewise be used alone or in conjunction with other epoxy type compounds which are selected with a view toward modifying the final properties of the polymer. These polymers have utility as potting compounds, adhesives, organic finishes, and other useful items of commerce.

The present compound, as such, has insecticidal activity and is effective when applied for the control of deleterious insects, including lice and mosquitoes. The epoxide of the present invention can be formulated as a solution, dust, or wettable powder, or other type formulations known in the insecticide art either as the sole toxic ingredient or in conjunction with other insect toxicants or knockdown agents.

I claim:

As a new composition of matter, 5,6-epoxy-1,2,3,4,7,7-hexachlorobicyclo-(2.2.1)-2-heptene.

References Cited in the file of this patent

UNITED STATES PATENTS 2,616,899    Ladd _____ Nov. 4, 1952